US009800781B2

(12) United States Patent
Bhat et al.

(10) Patent No.: US 9,800,781 B2
(45) Date of Patent: Oct. 24, 2017

(54) METHOD, APPARATUS, SYSTEM, AND COMPUTER READABLE MEDIUM FOR IMAGE PROCESSING SOFTWARE MODULE CONFIGURATION

(71) Applicant: Intel Corporation, Santa Clara, CA (US)

(72) Inventors: Sheethal Bhat, Watham, MA (US); Madhu S. Athreya, Saratoga, CA (US); Yuh-Lin E. Chang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 13/840,422

(22) Filed: Mar. 15, 2013

(65) Prior Publication Data
US 2014/0267811 A1 Sep. 18, 2014

(51) Int. Cl.
*H04N 5/232* (2006.01)
*G06F 1/32* (2006.01)

(52) U.S. Cl.
CPC ......... *H04N 5/23241* (2013.01); *G06F 1/324* (2013.01); *G06F 1/3262* (2013.01); *G06F 1/3287* (2013.01); *H04N 5/23267* (2013.01); *Y02B 60/1217* (2013.01); *Y02B 60/1282* (2013.01)

(58) Field of Classification Search
CPC ... H04N 5/232; H04N 5/23241; H04N 5/3698
See application file for complete search history.

(56) References Cited

U.S. PATENT DOCUMENTS

| 8,284,205 B2 | 10/2012 | Miller et al. |
| 2002/0004802 A1 | 1/2002 | Shima |
| 2003/0177241 A1* | 9/2003 | Katayama ........... G06F 11/3495 709/226 |

(Continued)

FOREIGN PATENT DOCUMENTS

| CN | 1798264 | 7/2006 |
| CN | 101729665 | 6/2010 |

(Continued)

OTHER PUBLICATIONS

PCT International Search Report and Written Opinion in PCT International Patent Application No. PCT/US2014/022709, mailed on Jun. 24, 2014 (10 pages).

(Continued)

*Primary Examiner* — Abdelaaziz Tissire
(74) *Attorney, Agent, or Firm* — Patent Capital Group

(57) ABSTRACT

Technologies are provided in embodiments for receiving an indication of an image processing service request, retrieve environmental information indicative of an environmental condition of an apparatus, retrieving operational information indicative of an operating condition of the apparatus, determining image processing software configuration information based, at least in part, on the image processing service, the environmental information, and the operational information, and causing configuration of at least one image processing software module based, at least in part, on the image processing software configuration information.

25 Claims, 11 Drawing Sheets

| | CONFIGURATION 322 | | | | | OPERATIONAL INFORMATION 324 | | ENVIRONMENTAL INFORMATION 326 | |
|---|---|---|---|---|---|---|---|---|---|
| | CAPTURE 330 | DVS 331 | TNR 332 | FACE DETECTION 333 | FACE RECOGNITION 334 | POWER CONSUMPTION 335 | TEMPERATURE 336 | LIGHT 337 | MOTION 338 |
| FULL RESOLUTION TORCH MODE | FULL ALGORITHM | FULL ALGORITHM | FULL ALGORITHM | FULL ALGORITHM | FULL ALGORITHM | LOW | LOW | LOW | MODERATE |
| FULL RESOLUTION NO TORCH MODE | FULL ALGORITHM | FULL ALGORITHM | FULL ALGORITHM | FULL ALGORITHM | FULL ALGORITHM | POWER LEVEL 342 | LOW | HIGH | MODERATE |
| FULL RESOLUTION NO TORCH MODE | DOWNGRADED ALGORITHM | DISABLED | FULL ALGORITHM | FULL ALGORITHM | | POWER LEVEL 344 | TEMPERATURE LEVEL 346 | HIGH | LOW |
| PARTIAL RESOLUTION NO TORCH MODE | DOWNGRADED ALGORITHM | DISABLED | DISABLED | DISABLED | | HIGH | HIGH | HIGH | MODERATE |

(56) References Cited

U.S. PATENT DOCUMENTS

| | | | |
|---|---|---|---|
| 2007/0030357 A1* | 2/2007 | Levien | G06T 1/0007 |
| | | | 348/211.14 |
| 2007/0165048 A1* | 7/2007 | Yamashita | G06T 5/009 |
| | | | 345/601 |
| 2007/0242937 A1 | 10/2007 | Sano et al. | |
| 2008/0133956 A1 | 6/2008 | Fadell | |
| 2009/0077399 A1 | 3/2009 | Noda et al. | |
| 2009/0089782 A1* | 4/2009 | Johnson | G06F 1/3203 |
| | | | 718/100 |
| 2009/0109230 A1* | 4/2009 | Miller | G06F 1/3203 |
| | | | 345/506 |
| 2012/0050307 A1* | 3/2012 | Mahowald | H05B 37/0218 |
| | | | 345/590 |
| 2012/0189265 A1* | 7/2012 | Okazaki | H04N 5/772 |
| | | | 386/227 |
| 2013/0329066 A1* | 12/2013 | Zhou | H04N 5/23248 |
| | | | 348/208.99 |

FOREIGN PATENT DOCUMENTS

| | | |
|---|---|---|
| JP | 2002189539 | 7/2002 |
| WO | WO 2014/150246 | 9/2014 |

OTHER PUBLICATIONS

PCT International Preliminary Report on Patentability in PCT International Application Serial No. PCT/US2014/022709 mailed on Sep. 15, 2015.

Extended European Search Report in EP Application No. 14770883.8 mailed Sep. 13, 2016 (7 pages).

Chinese First Office Action and Search Report in Chinese Patent Application No. 201480008908.5 dated Jun. 29, 2017, pp. 4-20 (English translation) and 23-30 (Chinese).

* cited by examiner

| CONFIGURATION 302 | OPERATIONAL INFORMATION 304 | ENVIRONMENTAL INFORMATION 305 |
|---|---|---|
| CONFIGURATION INFORMATION 310 | OPERATIONAL CONDITION 313 | ENVIRONMENTAL CONDITION 316 |
| CONFIGURATION INFORMATION 311 | OPERATIONAL CONDITION 314 | ENVIRONMENTAL CONDITION 317 |
| CONFIGURATION INFORMATION 312 | OPERATIONAL CONDITION 315 | ENVIRONMENTAL CONDITION 318 |

FIG. 3A

| CONFIGURATION 322 | | | | | OPERATIONAL INFORMATION 324 | | ENVIRONMENTAL INFORMATION 326 | |
|---|---|---|---|---|---|---|---|---|
| CAPTURE 330 | DVS 331 | TNR 332 | FACE DETECTION 333 | FACE RECOGNITION 334 | POWER CONSUMPTION 335 | TEMPERATURE 336 | LIGHT 337 | MOTION 338 |
| FULL RESOLUTION TORCH MODE | FULL ALGORITHM | FULL ALGORITHM | FULL ALGORITHM | FULL ALGORITHM | LOW | LOW | LOW | MODERATE |
| FULL RESOLUTION NO TORCH MODE | FULL ALGORITHM | FULL ALGORITHM | FULL ALGORITHM | FULL ALGORITHM | POWER LEVEL 342 | LOW | HIGH | MODERATE |
| FULL RESOLUTION NO TORCH MODE | DOWNGRADED ALGORITHM | DISABLED | FULL ALGORITHM | FULL ALGORITHM | POWER LEVEL 344 | TEMPERATURE LEVEL 346 | HIGH | LOW |
| PARTIAL RESOLUTION NO TORCH MODE | DOWNGRADED ALGORITHM | DISABLED | DISABLED | DISABLED | HIGH | HIGH | HIGH | MODERATE |

FIG. 3B

METHOD, APPARATUS, SYSTEM, AND COMPUTER READABLE MEDIUM FOR IMAGE PROCESSING SOFTWARE MODULE CONFIGURATION

TECHNICAL HELD

This disclosure relates in general to the field of image processing.

BACKGROUND

As electronic apparatuses have become more popular, many users have come to rely on many different types of electronic apparatuses. Some electronic apparatuses are powered by a local power source, such as a battery. In such electronic apparatuses, power consumption may be important to control to allow the user to enjoy a long battery life. In addition, as apparatus capabilities become more advanced, operating temperature becomes an increasing concern. For example, excessive operating temperature may harm the user and/or harm the apparatus. As video capabilities of electronic apparatuses become more advanced, and more nuanced, it becomes increasingly desirable to control power consumption and/or temperature of an electronic apparatus attributable to image processing in a robust manner.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3B are diagrams illustrating image processing software configuration information according to at least one embodiment;

DETAILED DESCRIPTION OF EMBODIMENTS

In many circumstances, electronic apparatuses may perform imaging related tasks that are associated with high power consumption. Such power consumption may bring the apparatus close to a thermal limitation and/or a power consumption limitation. In addition, there may be other parts of the apparatus that play a role in power consumption. The role that other parts of the apparatus play may vary based on the circumstances associated with operation of the apparatus. In addition, there may be one or more image processing software modules that are associated with varying levels of power consumption.

Similarly, exceeding memory bandwidth may result in severe performance problems. For example, exceeding memory bandwidth may introduce delays in processing, memory overflow, memory underflow, and/or the like.

In many cases, it may be desirable to avoid exceeding thermal, memory bandwidth, and/or power consumption limitations of an apparatus. For example, exceeding such limitation may damage the apparatus, may harm a user, and/or the like. It may be desirable to manage imaging related tasks to avoid imaging related devices and/or the apparatus from exceeding thermal and/or power consumption limitations.

Figure 1:
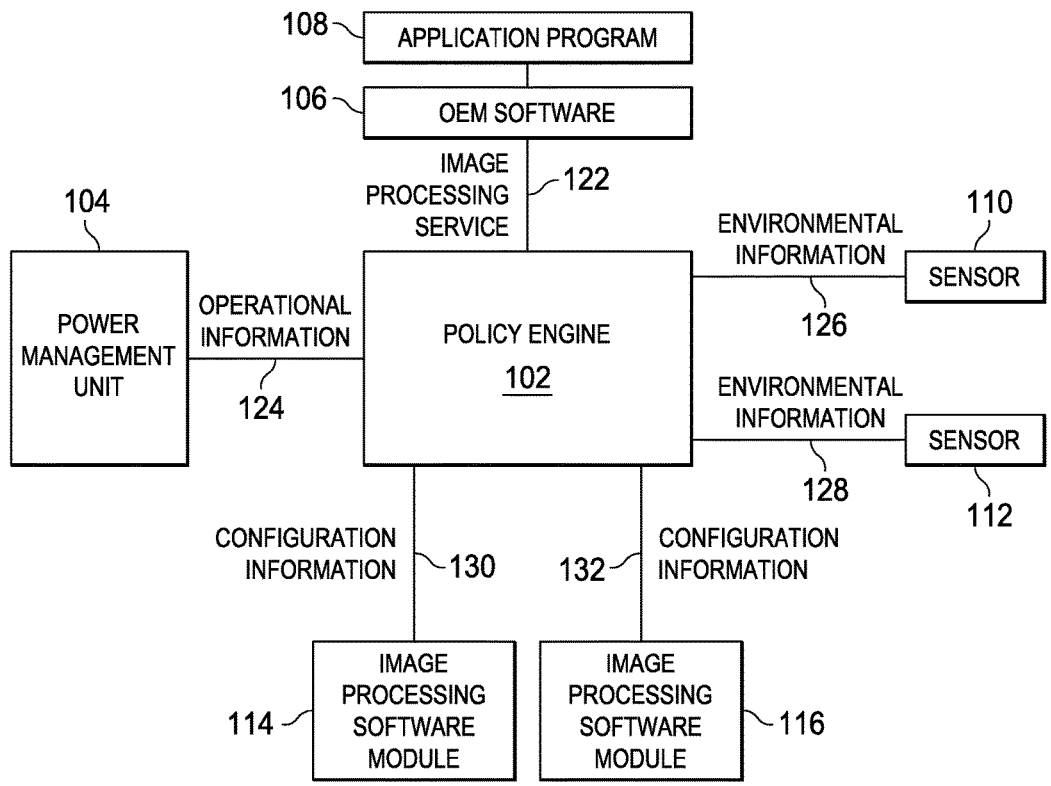
FIG. 1 is a block diagram illustrating components associated with image processing software module configuration according to at least one embodiment.

FIG. 1 is a block diagram illustrating components associated with image processing software module configuration according to at least one embodiment. The example of FIG. 1 is merely an example of components associated with image processing software module configuration, and does not limit the scope of the claims. For example, operations attributed to a component may vary, number of components may vary, composition of a component may vary, and/or the like. For example, in some embodiments, operations attributable to one component of the example of FIG. 1 may be allocated to one or more other components.

It may be desirable to avoid exceeding thermal, memory, and/or power consumption limitations by way of managing hardware performance. For example, power consumption and heat generation may be reduced by way of reducing processor speed, reducing display brightness, reducing charging current, and/or the like. In at least one embodiment, an apparatus performs configuration of hardware performance by way of determining hardware performance configuration information. In at least one embodiment, hardware performance configuration information relates to at least one of processor speed, display brightness, charging control.

It may be desirable to provide for adjustment of imaging tasks independent of hardware performance configuration instead of or in conjunction with hardware performance configuration. For example, it may be desirable to retain processor speed and to change an image processing task to reduce power consumption of an apparatus. For example, there may be circumstances where changing the image processing task may have a lesser user impact than a reduction in processor speed. Such adjustment of imaging tasks may comprise configuration of image processing software. In at least one embodiment, configuration of image processing software is independent of hardware performance configuration. For example, image processing software configuration information, which may be used to configure image processing software, may be independent of hardware performance configuration information. Without limiting the scope of the claims in any way, at least one technical effect associated with configuring image processing software independently from hardware performance configuration, with regards to power, memory, and/or thermal management, may be to allow for more configuration options for addressing power, memory, and/or thermal management concerns. For example, such additional options may allow for configurations that cause the apparatus to operate within power, memory, and/or thermal limitations with less user impact than hardware performance configuration alone.

In some electronic apparatuses, such as mobile phones, image processing tasks, such as video recording, may consume a large proportion of the apparatus's power and/or be accountable for a large portion of the apparatus's heat generation. Additional power consumption and/or heat generation may be associated with inclusion of image processing features, such as digital video stabilization (DVS), temporal and advanced noise reduction (TNR), higher resolution settings, flash utilization, such as a torch mode, face detection, face recognition, and/or the like. In such apparatuses, it may be desirable to manage configuration one or more such image processing software modules to accomplish management of at least one of heat generation or power consumption.

In at least one embodiment, an apparatus determines image processing software configuration information based, at least in part, on the image processing service, the environmental information, and the operational information. In at least one embodiment, image processing software configuration information relates to information associated with configuration of at least part of, one or more image processing software modules. Image processing software configuration information may be similar as described regarding FIGS. 3A-3B.

In at least one embodiment, environmental information relates to information indicative of an environmental condition. For example, environmental information may be a data structure, a message, sensor information and/or the like. In at least one embodiment, an environmental condition relates to an environmental condition associated with a user's ability to perceive information on a display. For example, the environmental condition may relate to ambient light at the apparatus. In such an example, the ambient light at the apparatus may impact the user's ability to view information on the display. For example, if the ambient light level is high, a brighter display may be desirable to facilitate user viewing. In another example, if the ambient light level is low, a dimmer display may be desirable to facilitate user viewing. In at least one embodiment, wherein an environmental condition relates to an environmental condition associated with capturing visual information, such as capturing an image and/or capturing video. For example, the environmental condition may relate to ambient light at the apparatus. In such an example, if the ambient light at the apparatus is low, it may be desirable to provide for compensation for the low light. In another example, the environmental information may relate to motion of the apparatus. For example, if there is motion of the apparatus, it may be desirable to provide for image stabilization.

In at least one embodiment, operational information relates to power consumption of at least part of, the apparatus. For example, operational information may relate to power consumption of the apparatus in general, of an image signal processor (ISP), a central processing unit (CPU), a system-on-ship (SOC), and/or the like. Power consumption may relate to power, current, and/or the like, being consumed. In at least one embodiment, the operational information relates to power consumption of one or more image processing components of the apparatus.

In at least one embodiment, operational information relates to a temperature of, at least part of, the apparatus. For example, operational information may relate to a temperature of the apparatus in general, of an image signal processor (ISP), a central processing unit (CPU), a system-on-ship (SOC), and/or the like. In at least one embodiment, the operational information relates to temperature of one or more image processing components of the apparatus.

In at least one embodiment, operational information relates to memory bandwidth associated with image processing. Memory bandwidth may relate to the amount of memory available for image processing, speed of memory associated with image processing, and/or the like The example of FIG. 1 illustrates policy engine 102 in communication with power management unit 104, original equipment manufacturer (OEM) software 106, sensor 110, sensor 112, image processing software module 114, and image processing software module 116. The example of FIG. 1 illustrates application program 108 in communication with OEM software 106. In at least one embodiment, an application program utilizes services from OEM software. The application program may utilize OEM software services such that any utilization of services from components below the OEM software occurs by communication by way of the OEM software. For example, if application program 108 requests an image processing service, application program 108 may request the service from OEM software 106, which may request the service from policy engine 102, such that application program 108 is isolated from policy engine 102.

In at least one embodiment, a policy engine relates to software associated with configuration of image processing software based, at least in part, on operational information and environmental information. The policy engine may be part of one or more modules and/or devices. For example, the policy engine may be part of a hardware abstraction layer, may be part of a device driver, may reside on an ISP, may reside on a CPU, may reside on a SOC, and/or the like. In at least one embodiment, OEM software relates to software of a computing system that utilizes the services of the policy engine independently from the policy engine itself. In at least one embodiment, a power management unit relates to a hardware module and/or a software module associated with monitoring temperature, memory, and/or power consumption of at least part of the apparatus. In at least one embodiment, the power management unit may perform hardware performance configuration based, at least in part, on temperature information, memory information, and/or power consumption information.

In the example of FIG. 1, policy engine 102 retrieves environmental information 126 from sensor 110 and receives environmental information 128 from sensor 112. Sensors 110 and 112 may relate to a light sensor, a motion sensor, and/or the like. For example, the motion sensor may relate to an accelerometer, a gyroscope, and/or the like. In at least one embodiment, the policy engine retrieves environmental information directly from the sensor. In at least one example, embodiment, the policy engine retrieves the environmental information indirectly from the sensor. For example, the policy engine may retrieve the environmental information from a sensor controller, from a sensor driver, and/or the like. In at least one embodiment, the policy engine retrieves environmental information independently of OEM software. For example, the OEM software may be outside of the communication path from a sensor that provides environmental information and the policy engine.

In the example of FIG. 1, policy engine 102 retrieves operational information 124 from power management unit 104. In at least one embodiment, the policy engine retrieves operational information from a component other than a power management unit, such as a sensor, a sensor controller, from a sensor driver, and/or the like. In at least one embodiment, the policy engine retrieves operational information independently of OEM software. For example, the OEM software may be outside of the communication path from a sensor that provides operational information and the policy engine.

In at least one embodiment, policy engine 102 receives an indication of an image processing service request 122 from OEM software 122. The indication may relate to a message, a function call, and/or the like, that communicates a desire for an image processing service to be provided. The image processing service may relate to capture of an image, capture of video, rendering of an image, rendering of a video, and/or the like.

In at least one embodiment, policy engine 102 causes configuration of at least one image processing software module based, at least in part, on image processing software configuration information. In the example of FIG. 1, policy engine 102 causes configuration of image processing software module 114 by sending configuration information 130. In at least one embodiment, configuration information 130 is comprised by image processing software configuration information. In the example of FIG. 1, policy engine 102 causes configuration of image processing software module 116 by sending configuration information 132. In at least one embodiment, configuration information 130 is comprised by image processing software configuration information.

Figure 2:
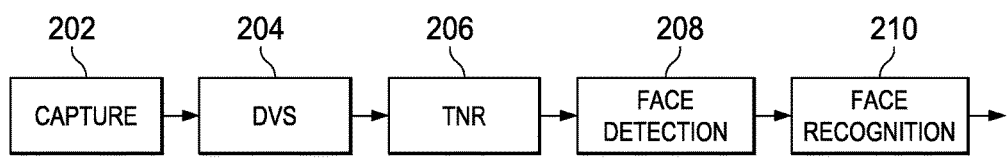
FIG. 2 is another block diagram illustrating image processing software modules according to at least one embodiment.

FIG. 2 is another block diagram illustrating image processing software modules according to at least one embodiment. The example of FIG. 2 is merely an example of image processing software modules, and does not limit the scope of the claims. For example, operations attributed to a module may vary, number of modules may vary, composition of a module may vary, and/or the like. For example, in some embodiments, operations attributable to one module of the example of FIG. 2 may be allocated to one or more other modules.

One or more image processing software modules may be associated with different layers of an image capturing stack. For example a DVS module may be associated with one layer of an image capturing stack, such as an ISP pipeline, and face detection module may be associated with an application layer of an image capturing stack. As such, causation of configuration may differ between image processing software modules. For example, configuration of a DVS module or a TNR module may be associated with the ISP, and configuration of a face detection module or a face recognition module may be associated with a hardware abstraction interface.

In the example of FIG. 2, capture image processing software module 202 is in communication with DVS image processing software module 204. In the example of FIG. 2, DVS image processing software module 204 is in communication with TNR image processing software module 206. In the example of FIG. 2, TNR image processing software module 206 is in communication with face detection image processing software module 208. In the example of FIG. 2, face detection image processing software module 208 is in communication with face recognition image processing software module 210.

In at least one embodiment, each image processing software module has an associated effect regarding visual information. For example, a capture module may have an effect associated with acquisition of visual information at a resolution, and having a lighting characteristic. In another example, a DVS module may have an effect associated with reducing perceived movement in the received visual information. In another example, a TNR module may have an effect associated with reducing noise in the received visual information. In another example, a face detection module may have an effect associated with identifying presence of one or more faces in the received visual information. In another example, a face recognition module may have an effect associated with determining an identity associated with a face in the received visual information.

In at least one embodiment, a capture module, such as capture module 202, is associated with receiving information from a visual capture device, such as a camera module. In at least one embodiment, a capture module may be configured to control resolution of the captured visual information, frame rate of captured video information, and/or the like. In at least one embodiment, operation of the capture module when configured at lower resolution is associated with less power consumption and less heat generation than the capture module when configured at a higher resolution. In this manner, a policy engine may vary configuration of resolution to vary power consumption and/or heat generation attributable to the capture module. In at least one embodiment, a policy engine may cause configuration of the capture module with regards to light compensation. For example, the policy engine may enable and/or disable a torch mode associated with improving lighting associated with captured visual information.

In at least one embodiment, a DVS module, such as DVS module 204, is associated with receiving visual information from another module, such as a capture module, a TNR module, and/or the like. In at least one embodiment, a DVS module may be configured to control an amount of stabilization to provide, which algorithm to use for stabilization, and/or the like. In at least one embodiment, the DVS module comprises a plurality of stabilization algorithms that vary in regards to power consumption, heat generation, effectiveness, and/or the like. For example, a full algorithm may be more effective regarding stabilization than a downgraded algorithm, but have be associated with higher power consumption and heat generation than the downgraded algorithm. In such circumstances, a policy engine may cause configuration of the algorithm utilized in order to control power consumption and/or heat generation. In at least one embodiment, a policy engine enables and/or disables a DVS module. For example, a DVS module may be disabled by removing the module from an image processing pipeline, by sending a directive to the module to perform no operations associated with visual information, and/or the like. For example, the policy engine may send a directive to the DVS module that causes the module to perform no operations regarding any received visual information other than passing the visual information to another module.

In at least one embodiment, a TNR module, such as TNR module 206, is associated with receiving visual information from another module, such as a capture module, a DVS module, and/or the like. In at least one embodiment, a TNR module may be configured to control an amount of noise reduction to provide, which algorithm to use for noise reduction, and/or the like. In at least one embodiment, the TNR module comprises a plurality of noise reduction algorithms that vary in regards to power consumption, heat generation, effectiveness, and/or the like. For example, a full algorithm may be more effective regarding noise reduction than a downgraded algorithm, but have be associated with higher power consumption and heat generation than the downgraded algorithm. In such circumstances, a policy engine may cause configuration of the algorithm utilized in order to control power consumption and/or heat generation. In at least one embodiment, a policy engine enables and/or disables a TNR module. For example, a TNR module may be disabled by removing the module from an image processing pipeline, by sending a directive to the module to perform no operations associated with visual information, and/or the like. For example, the policy engine may send a directive to the DVS module that causes the module to perform no operations regarding any received visual information other than passing the visual information to another module.

In at least one embodiment, a face detection module, such as face detection module 208, is associated with receiving visual information from another module, such as a capture module, a TNR module, a DVS module, and/or the like. In at least one embodiment, a face detection module may be configured to control effectiveness of face detection to provide, which algorithm to use for stabilization, and/or the like. In at least one embodiment, the face detection module comprises a plurality of face detection algorithms that vary in regards to power consumption, heat generation, effectiveness, and/or the like. For example, a full algorithm may be more effective regarding face detection than a downgraded algorithm, but have be associated with higher power consumption and heat generation than the downgraded algorithm. In such circumstances, a policy engine may cause configuration of the algorithm utilized in order to control power consumption and/or heat generation. In at least one embodiment, a policy engine enables and/or disables a face detection module. For example, a face detection module may be disabled by removing the module from an image processing pipeline, by sending a directive to the module to perform no operations associated with visual information, and/or the like. For example, the policy engine may send a directive to the face detection module that causes the module to perform no operations regarding any received visual information other than passing the visual information to another module.

In at least one embodiment, a face recognition module, such as face recognition module 210, is associated with receiving visual information from another module, such as a capture module, a TNR module, a DVS module, a face detection module, and/or the like. In at least one embodiment, a face recognition module may be configured to control an effectiveness of face recognition to provide, which algorithm to use for face recognition, and/or the like. In at least one embodiment, the face recognition module comprises a plurality of face recognition algorithms that vary in regards to power consumption, heat generation, effectiveness, and/or the like. For example, a full algorithm may be more effective regarding face recognition than a downgraded algorithm, but have be associated with higher power consumption and heat generation than the downgraded algorithm. In such circumstances, a policy engine may cause configuration of the algorithm utilized in order to control power consumption and/or heat generation. In at least one embodiment, a policy engine enables and/or disables a face recognition module. For example, a face recognition module may be disabled by removing the module from an image processing pipeline, by sending a directive to the module to perform no operations associated with visual information, and/or the like. For example, the policy engine may send a directive to the face recognition module that causes the module to perform no operations regarding any received visual information other than passing the visual information to another module. In at least one embodiment, a policy engine may configure effectiveness of a face recognition module by way of configuring the number of faces which the face recognition will attempt to recognize. For example, recognition of a larger set of faces may be associated with more power consumption and heat generation than recognition of a smaller set of faces. In at least one embodiment, a downgraded face recognition algorithm relates to performance of face recognition by way of a reduced set of faces.

FIGS. 3A-3B are diagrams illustrating image processing software configuration information according to at least one embodiment. The examples of FIG. 3A-3B are merely examples of image processing software configuration information, and do not limit the scope of the claims. For example, types of information may vary, a relationship between information may vary, and/or the like.

In at least one embodiment, an apparatus determines image processing software configuration information. In at least one embodiment, the image processing software module configuration information comprises information associated with configuration of one or more image processing software modules. In at least one embodiment, the apparatus may determine image processing software configuration information and hardware performance configuration information. In at least one embodiment, the image processing software configuration information is independent of the hardware performance configuration information. For example, the image processing software configuration information may be absent any hardware performance configuration information.

In at least one embodiment, determination of the image processing software configuration information is based, at least in part, on a correlation between an effect of the at least one image processing software module and an environmental condition. For example, if an environmental condition indicates circumstances where an effect associated with an image processing software module is less applicable, undesirable, unwarranted, and/or the like, the image processing software configuration information may be determined to reduce power consumption and/or heat generation associated with the image processing software module.

For example, the environmental condition may relate to motion and the effect of the at least one image processing software module relates to video stabilization. In such an example, image processing software configuration information associated with a DVS module may be based, at least in part, on the motion. For example, if there is an absence of motion, the image processing software configuration information associated with the DVS module may comprise information for configuration of the DVS module such that the DVS module consumes less power and/or generates less heat than under circumstances where motion is present.

In another example, the environmental condition may relate to ambient light and the effect of the at least one image processing software module may relate to video stabilization. In such an example, image processing software configuration information associated with a DVS module may be based, at least in part, on the ambient light. For example, if there is a high level of ambient light, the resulting exposure time associated with image capturing may be low. In such circumstances, the benefit associated with image stabilization may be less than the benefit associated with higher exposure time. Therefore, in such an example, the image processing software configuration information associated with the DVS module may comprise information for configuration of the DVS module such that the DVS module consumes less power and/or generates less heat than under circumstances where ambient light is low.

In another example, the environmental condition may relate to ambient light and the effect of the at least one image processing software module may relate to noise reduction. In such an example, image processing software configuration information associated with a TNR module may be based, at least in part, on the ambient light. For example, if there is a high level of ambient light, noise associated with captured visual information may be low. In such circumstances, the benefit associated with noise reduction may be less than the benefit associated with lower ambient light. Therefore, in such an example, the image processing software configuration information associated with the TNR module may comprise information for configuration of the TNR module such that the TNR module consumes less power and/or generates less heat than under circumstances where ambient light is low.

In another example, the environmental condition may relate to ambient light and the effect of the at least one image processing software module may relate to light compensation, such as a torch mode of a capture module. In such an example, image processing software configuration information associated with a capture module may be based, at least in part, on the ambient light. For example, if there is a high level of ambient light, the benefit associated with light compensation may be less than the benefit associated with lower ambient light. Therefore, in such an example, the image processing software configuration information associated with the capture module may comprise information for configuration of the light compensation such that the capture module consumes less power and/or generates less heat than under circumstances where ambient light is low.

In at least one embodiment, determination of the image processing software configuration information is based, at least in part, on priority information associated with the at least one image processing software module and at least one other image processing software module. In at least one embodiment, priority information associated with at least one image processing software module and at least one other image processing software module relates to information associated with determination of image processing software configuration information that causes reduction in power consumption associated with the image processing software module, while maintaining power consumption associated with the other image processing software module. In at least one embodiment, priority information is based, at least in part, on relative benefits of the image processing software module and the other image processing software module, under a set of circumstances. For example, in certain environmental conditions, face detection may be more desirable than noise reduction.

In at least one embodiment, the priority information relates to prioritization of image compensation over image supplementation. In at least one embodiment, image supplementation relates to at least one of face recognition or face detection. In at least one embodiment, image compensation relates to at least one of video stabilization, noise reduction, image resolution, or light compensation.

In at least one embodiment, determination of the image processing software configuration information is based, at least in part, on correlation between the operational information and operation profile information associated with the at least one image processing software module and the environmental condition. In at least one embodiment, operation profile information relates to information indicative of at least one configuration associated with at least one image processing software module with regards to at least one environmental condition and at least one operational condition.

FIG. 3A is a diagram illustrating image processing software configuration information according to at least one embodiment. In the example of FIG. 3A, operation profile information comprises image processing software configuration information is shown, under a heading of configuration 302, in relation to associated operational information 304 and environmental information 305. In at least one embodiment, an apparatus determines image processing software configuration information by way of correlating an operational condition and environmental condition in accordance with operation profile information. For example, an apparatus may determine image processing software configuration information 310, based, at least in part, or correlation of retrieved operational information with operational condition 313, and correlation of retrieved environmental information and environmental condition 316. In another example, an apparatus may determine image processing software configuration information 311, based, at least in part, or correlation of retrieved operational information with operational condition 314, and correlation of retrieved environmental information and environmental condition 317. In another example, an apparatus may determine image processing software configuration information 312, based, at least in part, or correlation of retrieved operational information with operational condition 315, and correlation of retrieved environmental information and environmental condition 318.

Even though the example of FIG. 3A relates to a table, any structure may be utilized in correlation of image processing software configuration information with operational information and environmental information, and, as such, does not limit the claims in any way.

FIG. 3B is a diagram illustrating image processing software configuration information according to at least one embodiment. In the example of FIG. 3B, operation profile information comprises image processing software configuration information is shown, under a heading of configuration 322, in relation to associated operational information 324 and environmental information 325. In the example of FIG. 3B, image processing software configuration information comprises image processing software module configuration information of a plurality of image processing software modules, namely, capture module configuration information 330, DVS module configuration information 331, TNR module configuration information 332, face detection module configuration information 333, and face recognition module configuration information 334. In the example of FIG. 3B, operational information 324 comprises at least one of power consumption information 335 or temperature information 336. In the example of FIG. 3B, environmental information 326 comprises at least one of light information 337 or motion information 337.

In at least one embodiment, an apparatus determines image processing software configuration information by way of correlating an operational condition and environmental condition in accordance with operation profile information. For example, an apparatus may determine capture module configuration information associated with full resolution with torch mode enabled, DVS module configuration information associated with a full DVS algorithm, TNR module configuration information associated with a full TNR algorithm, face detection module configuration information associated with a full face detection algorithm, and face recognition module configuration information associated with full face recognition algorithm based, at least in part, on low power consumption, low temperature, a high level of ambient light, and a moderate amount of motion.

In another example, an apparatus may determine capture module configuration information associated with full resolution with torch mode disabled, DVS module configuration information associated with a full DVS algorithm, TNR module configuration information associated with a full TNR algorithm, face detection module configuration information associated with a full face detection algorithm, and face recognition module configuration information associated with full face recognition algorithm based, at least in part, on a power consumption at a power level 342, which is higher than a low power level and lower than power level 244, low temperature, a high level of ambient light, and a moderate amount of motion.

In another example, an apparatus may determine capture module configuration information associated with full resolution with torch mode disabled, DVS module configuration information associated with a downgraded DVS algorithm, TNR module configuration information associated with TNR disablement, face detection module configuration information associated with a full face detection algorithm, and face recognition module configuration information associated with full face recognition algorithm based, at least in part, on a power consumption at a power level 344, which is lower than a high power level and higher than power level 242, a temperature level 346, which is between a low temperature and a high temperature, a high level of ambient light, and a low amount of motion.

In another example, an apparatus may determine capture module configuration information associated with partial resolution with torch mode disabled, DVS module configuration information associated with a downgraded DVS algorithm, TNR module configuration information associated with TNR disablement, face detection module configuration information associated with a face detection disablement, and face recognition module configuration information associated with face recognition disablement based, at least in part, on a high power consumption, a high temperature, a high level of ambient light, and a moderate amount of motion.

Even though the example of FIG. 3A relates to a table, any structure may be utilized in correlation of image processing software configuration information with operational information and environmental information, and, as such, does not limit the claims in any way. In the example of FIG. 3B, terms low and high regarding power consumption and temperature are meant to be relative to other terms regarding power consumption an temperature. For example, the term low is used to indicate a level that is lower than the term high. A person having ordinary skill in the art can readily ascertain, without undue experimentation, absolute and/or approximate values that relate to low and/or high power consumption levels and/or temperature levels. For example, a high level may relate to a level that is beyond a threshold. For example, there may be a temperature threshold that is indicative of a temperature, beyond which continuation of operation at such temperature is undesirable. In another example, there may be a power consumption threshold that is indicative of a power consumption level, beyond which continuation of operation at such power consumption is undesirable.

In addition to the utilization of temperature and power information of the examples of FIGS. 3A and 3B, other information may be utilized in determination of image processing software configuration information, such as memory bandwidth information, performance metric information, and/or the like. For example, if memory bandwidth consumption is high, for example high enough to cause frame dropping, the image processing software configuration information may relate to downgrading and/or disabling one or more image processing software modules.

Figure 4:
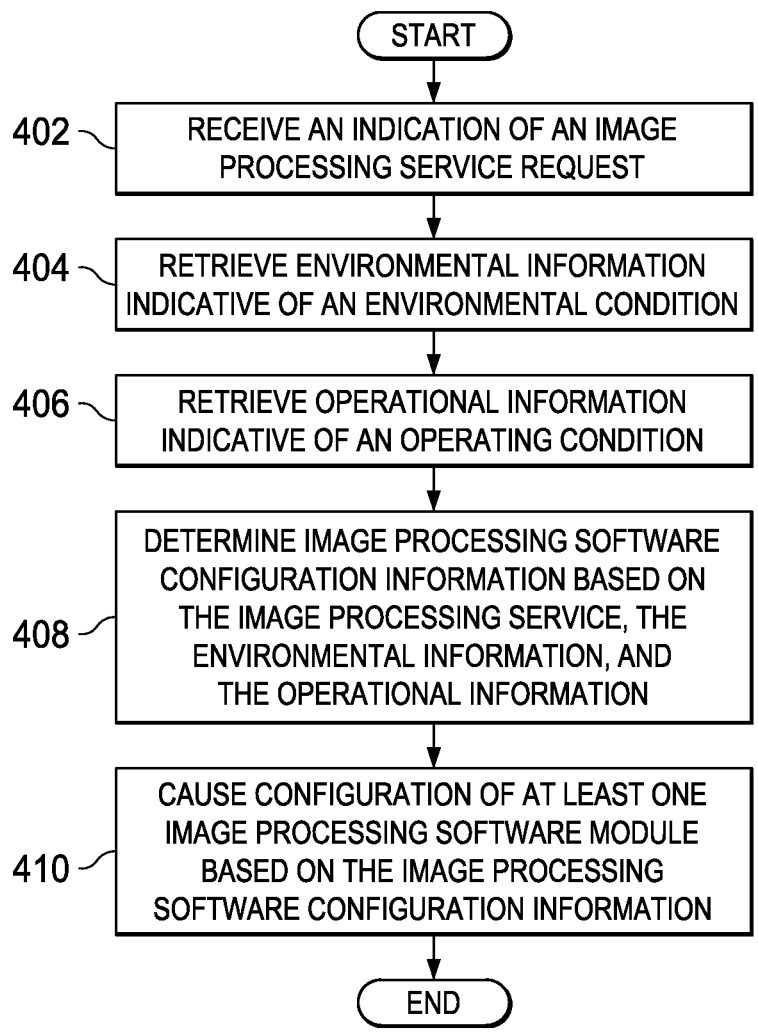
FIG. 4 is a flow diagram illustrating activities associated with image processing software module configuration according to at least one embodiment.

FIG. 4 is a flow diagram illustrating activities associated with image processing software module configuration according to at least one embodiment. In at least one embodiment, there is a set of operations that corresponds to the activities of FIG. 4. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 4.

At block 402, the apparatus receives an indication of an image processing service request. The receiving, the indication, and the image processing service request may be similar as described regarding FIG. 1.

At block 404, the apparatus retrieves environmental information indicative of an environmental condition of an apparatus. The retrieval, the environmental information, and the environmental condition may be similar as described regarding FIG. 1.

At block 406, the apparatus retrieves operational information indicative of an operating condition of the apparatus. The retrieval, the operational information, and the operating condition may be similar as described regarding FIG. 1.

At block 408, the apparatus determines image processing software configuration information based, at least in part, on the image processing service, the environmental information, and the operational information. The determination and the image processing software configuration information may be similar as described regarding FIGS. 1, 2, 3A, and 3B.

At block 410, the apparatus causes configuration of at least one image processing software module based, at least in part, on the image processing software configuration information. The causation of configuration may be similar as described regarding FIGS. 1 and 2.

Figure 5:
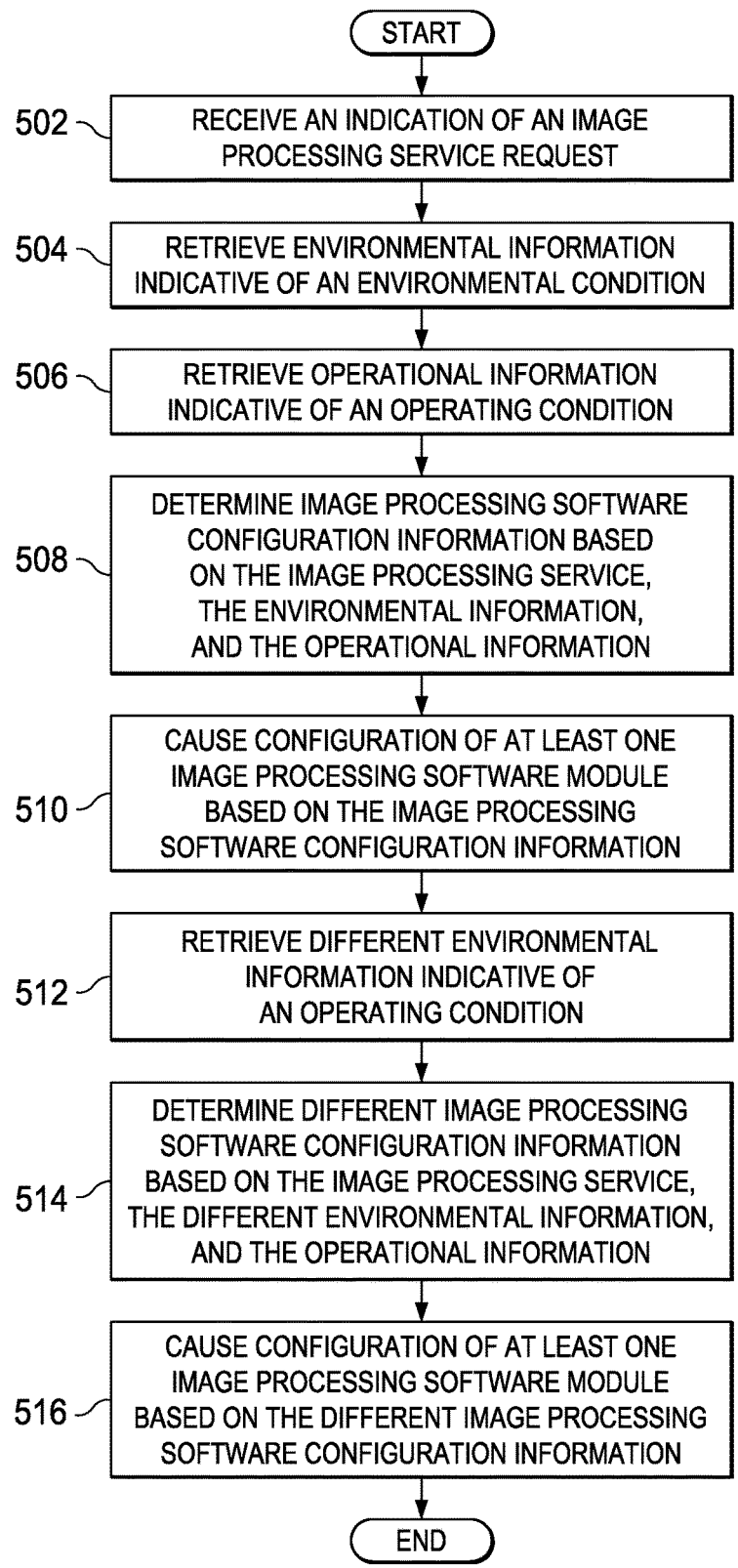
FIG. 5 is a flow diagram illustrating activities associated with image processing software module configuration according to at least one embodiment.

FIG. 5 is a flow diagram illustrating activities associated with image processing software module configuration according to at least one embodiment. In at least one embodiment, there is a set of operations that corresponds to the activities of FIG. 5. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 5.

In at least one embodiment, a policy engine retrieves different environmental information indicative of a change in the environmental condition. In such circumstances, the apparatus may determine different image processing software configuration information based, at least in part, on the change. For example the change may relate to an increase in ambient light, a decrease in ambient light, an increase in motion, a decrease in motion, and/or the like. In at least one embodiment, the apparatus may cause configuration of one or more image processing software modules, based at least in part, on the change.

At block 502, the apparatus receives an indication of an image processing service request, similarly as described regarding block 402 of FIG. 4. At block 504, the apparatus retrieves environmental information indicative of an environmental condition of an apparatus, similarly as described regarding block 404 of FIG. 4. At block 506, the apparatus retrieves operational information indicative of an operating condition of the apparatus, similarly as described regarding block 406 of FIG. 4. At block 508, the apparatus determines image processing software configuration information based, at least in part, on the image processing service, the environmental information, and the operational information, similarly as described regarding block 408 of FIG. 4. At block 510, the apparatus causes configuration of at least one image processing software module based, at least in part, on the image processing software configuration information, similarly as described regarding block 410 of FIG. 4.

At block 512, the apparatus retrieves different environmental information indicative of a change in the environmental condition. The retrieval, the different environmental information, and the changed environmental condition may be similar as described regarding FIG. 1.

At block 514, the apparatus determines different image processing software configuration information based, at least in part, on the image processing service, the different environmental information, and the operational information. The determination and the image processing software configuration information may be similar as described regarding FIGS. 1, 2, 3A, and 3B.

At block 516, the apparatus causes configuration of the at least one image processing software module based, at least in part, on the different image processing software configuration information. The causation of configuration may be similar as described regarding FIGS. 1 and 2. In at least one embodiment, causation of configuration of the at least one image processing software module are performed absent user notification of the different image processing software configuration information. For example, the user may be unaware of the change in the environmental condition, the change in the image processing software configuration information, and/or the like.

Figure 6:
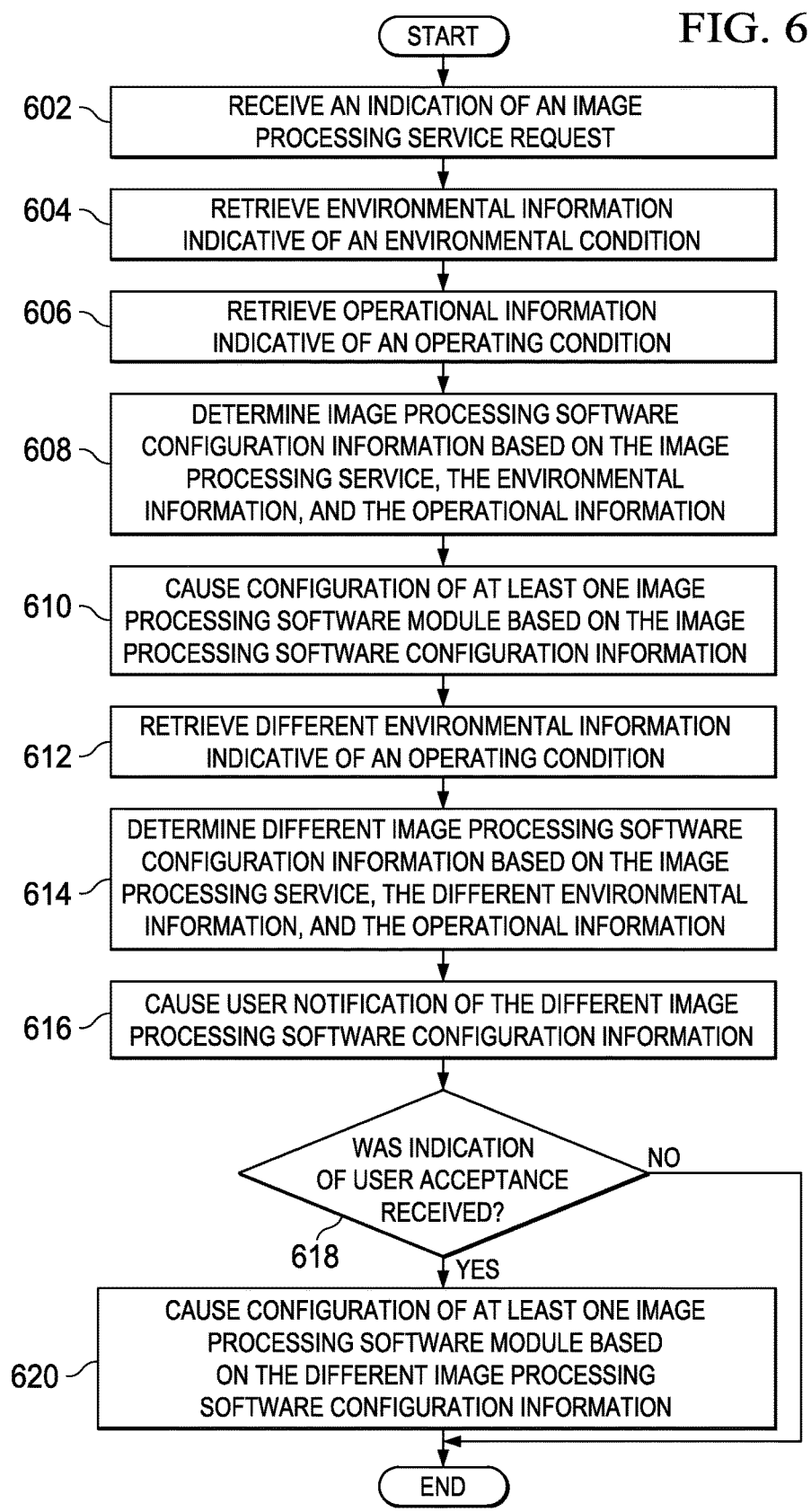
FIG. 6 is a flow diagram illustrating activities associated with image processing software module configuration according to at least one embodiment.

FIG. 6 is a flow diagram illustrating activities associated with image processing software module configuration according to at least one embodiment. In at least one embodiment, there is a set of operations that corresponds to the activities of FIG. 6. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 6.

In some circumstances, it may be desirable to provide a user with a notification that a change in environmental condition makes changing image processing software configuration desirable. In such an example, it may be desirable to allow a user determine whether the apparatus causes configuration of one or more image processing software modules based, at least in part, on a different image processing software configuration information. For example, the user may desire to retain a present configuration regardless of the change.

In at least one embodiment, the apparatus provides the user with a plurality of image processing software configuration information. In such an example, the apparatus may allow for user selection of image processing software configuration information such the user may control which image processing software configuration information is utilized in causation of configuration of the image processing software modules.

At block 602, the apparatus receives an indication of an image processing service request, similarly as described regarding block 402 of FIG. 4. At block 604, the apparatus retrieves environmental information indicative of an environmental condition of an apparatus, similarly as described regarding block 404 of FIG. 4. At block 606, the apparatus retrieves operational information indicative of an operating condition of the apparatus, similarly as described regarding block 406 of FIG. 4. At block 608, the apparatus determines image processing software configuration information based, at least in part, on the image processing service, the environmental information, and the operational information, similarly as described regarding block 408 of FIG. 4. At block 610, the apparatus causes configuration of at least one image processing software module based, at least in part, on the image processing software configuration information, similarly as described regarding block 410 of FIG. 4. At block 612, the apparatus retrieves different environmental information indicative of a change in the environmental condition similarly as described regarding block 512 of FIG. 5. At block 614, the apparatus determines different image processing software configuration information based, at least in part, on the image processing service, the different environmental information, and the operational information, similarly as described regarding block 514 of FIG. 5.

At block 616, the apparatus causes user notification of the different image processing software configuration information. In at least one embodiment, the user notification comprises at least one alternative image processing software configuration information. At block 618, the apparatus determines whether an indication of user acceptance of the different image processing software configuration information was received. In at least one embodiment, an indication of user acceptance relates to an indication that a user has provided an input that is consistent with a user deciding to allow configuration to occur based on the different image processing software configuration information. If, at block 618, the apparatus determines that there was no received user acceptance, flow terminates. If, at block 618, the apparatus determines that the apparatus received an indication of user acceptance, flow proceeds to block 620. At block 620, the apparatus causes configuration of the at least one image processing software module based, at least in part, on the different image processing software configuration information, similarly as described regarding block 516 of FIG. 5.

Figure 7:
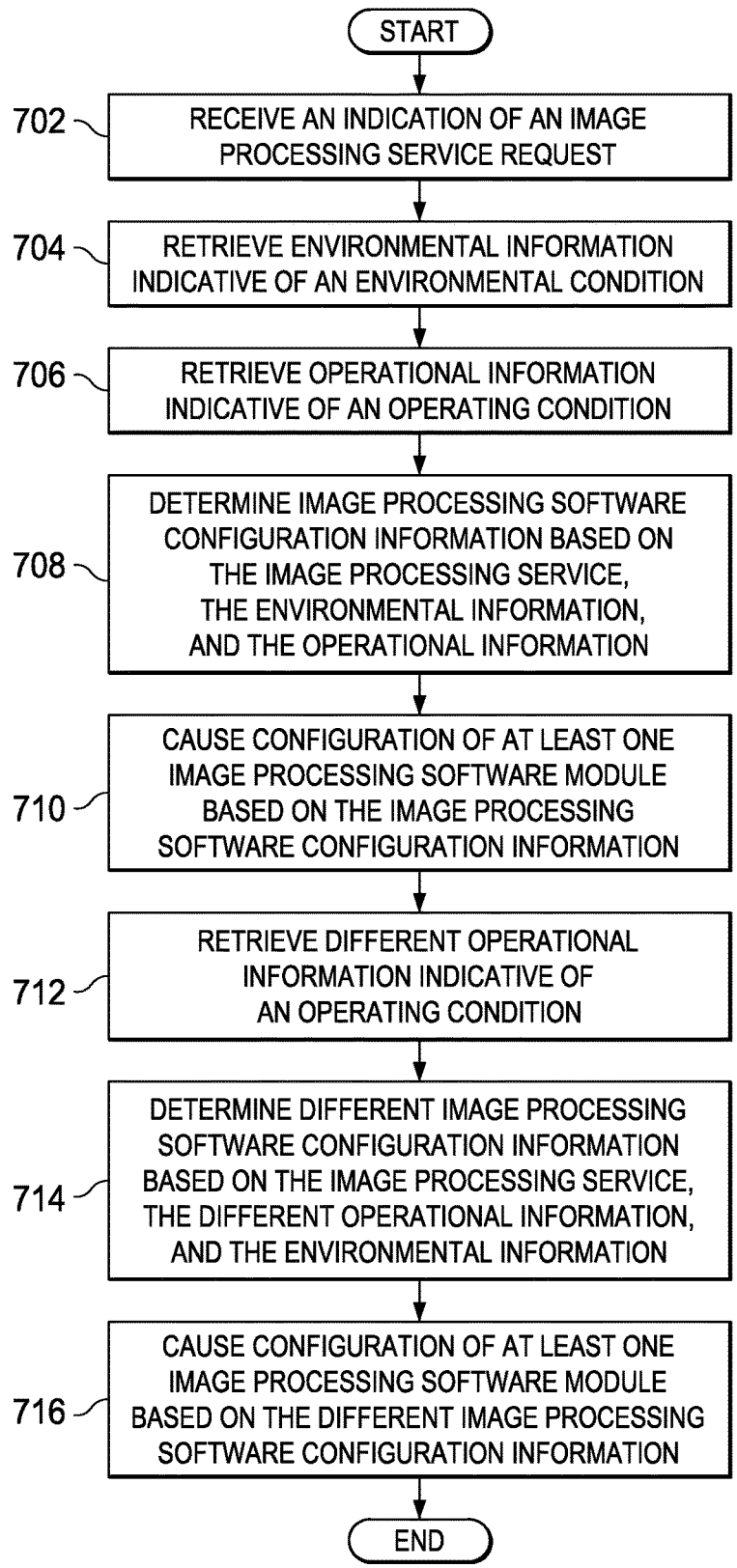
FIG. 7 is a flow diagram illustrating activities associated with image processing software module configuration according to at least one embodiment.

FIG. 7 is a flow diagram illustrating activities associated with image processing software module configuration according to at least one embodiment. In at least one embodiment, there is a set of operations that corresponds to the activities of FIG. 7. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 7.

In at least one embodiment, a policy engine retrieves different operational information indicative of a change in the operational condition. In such circumstances, the apparatus may determine different image processing software configuration information based, at least in part, on the change. For example the change may relate to an increase in temperature, a decrease in temperature, an increase in power consumption, a decrease in power consumption, and/or the like. In at least one embodiment, the apparatus may cause configuration of one or more image processing software modules, based at least in part, on the change.

At block 702, the apparatus receives an indication of an image processing service request, similarly as described regarding block 402 of FIG. 4. At block 704, the apparatus retrieves environmental information indicative of an environmental condition of an apparatus, similarly as described regarding block 404 of FIG. 4. At block 706, the apparatus retrieves operational information indicative of an operating condition of the apparatus, similarly as described regarding block 406 of FIG. 4. At block 708, the apparatus determines image processing software configuration information based, at least in part, on the image processing service, the environmental information, and the operational information, similarly as described regarding block 408 of FIG. 4. At block 710, the apparatus causes configuration of at least one image processing software module based, at least in part, on the image processing software configuration information, similarly as described regarding block 410 of FIG. 4.

At block 712, the apparatus retrieves different operational information indicative of a change in the operational condition. The retrieval, the different operational information, and the changed operational condition may be similar as described regarding FIG. 1.

At block 714, the apparatus determines different image processing software configuration information based, at least in part, on the image processing service, the environmental information, and the different operational information. The determination and the image processing software configuration information may be similar as described regarding FIGS. 1, 2, 3A, and 3B.

At block 716, the apparatus causes configuration of the at least one image processing software module based, at least in part, on the different image processing software configuration information. The causation of configuration may be similar as described regarding FIGS. 1 and 2. In at least one embodiment, causation of configuration of the at least one image processing software module are performed absent user notification of the different image processing software configuration information. For example, the user may be unaware of the change in the operational condition, the change in the image processing software configuration information, and/or the like.

Figure 8:
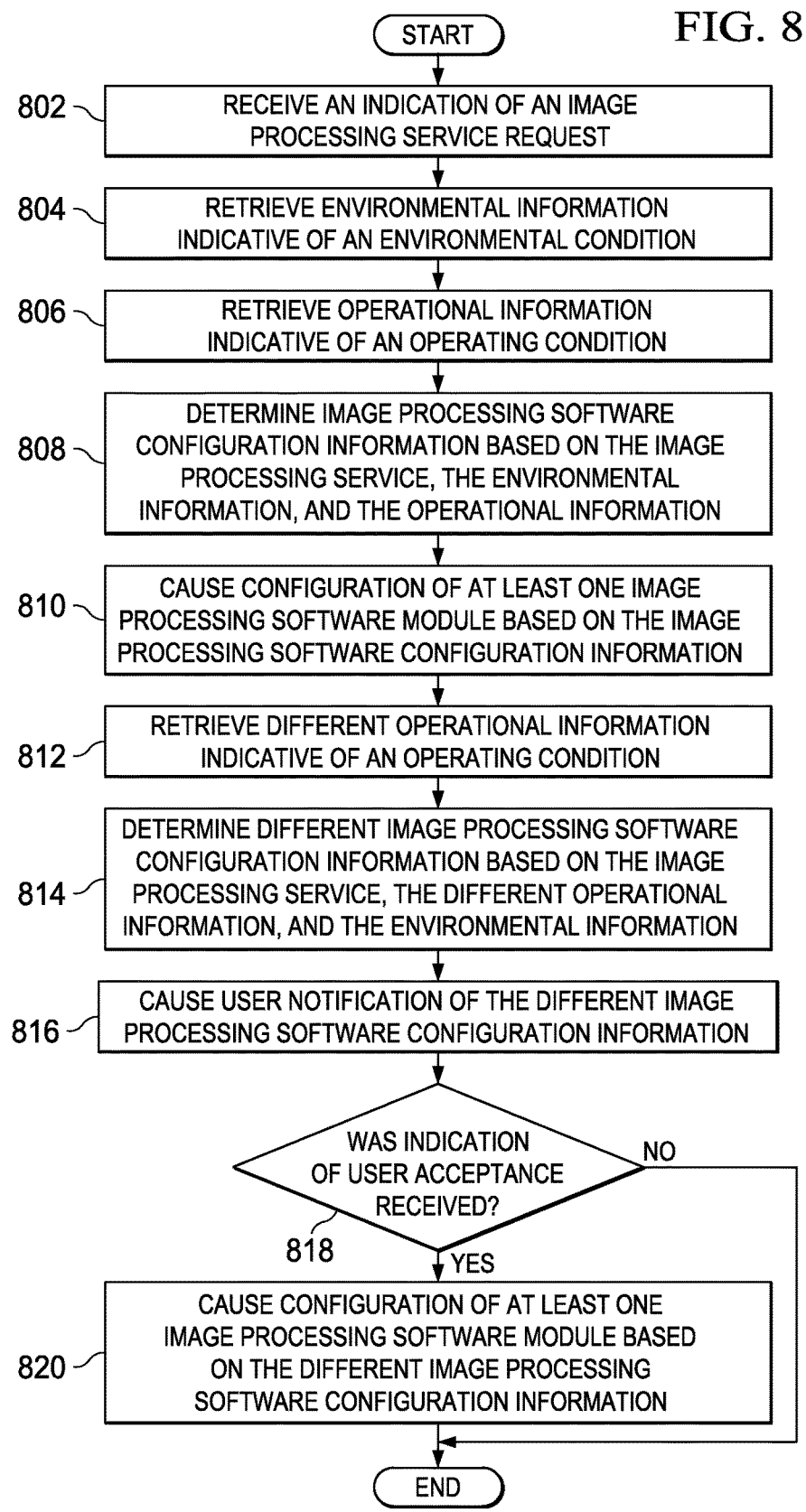
FIG. 8 is a flow diagram illustrating activities associated with image processing software module configuration according to at least one embodiment.

FIG. 8 is a flow diagram illustrating activities associated with image processing software module configuration according to at least one embodiment. In at least one embodiment, there is a set of operations that corresponds to the activities of FIG. 8. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 8.

In some circumstances, it may be desirable to provide a user with a notification that a change in operational condition makes changing image processing software configuration desirable. In such an example, it may be desirable to allow a user determine whether the apparatus causes configuration of one or more image processing software modules based, at least in part, on a different image processing software configuration information. For example, the user may desire to retain a present configuration regardless of the change.

In at least one embodiment, the apparatus provides the user with a plurality of image processing software configuration information. In such an example, the apparatus may allow for user selection of image processing software configuration information such the user may control which image processing software configuration information is utilized in causation of configuration of the image processing software modules.

At block 802, the apparatus receives an indication of an image processing service request, similarly as described regarding block 402 of FIG. 4. At block 804, the apparatus retrieves environmental information indicative of an environmental condition of an apparatus, similarly as described regarding block 404 of FIG. 4. At block 806, the apparatus retrieves operational information indicative of an operating condition of the apparatus, similarly as described regarding block 406 of FIG. 4. At block 808, the apparatus determines image processing software configuration information based, at least in part, on the image processing service, the environmental information, and the operational information, similarly as described regarding block 408 of FIG. 4. At block 810, the apparatus causes configuration of at least one image processing software module based, at least in part, on the image processing software configuration information, similarly as described regarding block 410 of FIG. 4. At block 812, the apparatus retrieves different environmental information indicative of a change in the operational condition similarly as described regarding block 712 of FIG. 7. At block 814, the apparatus determines different image processing software configuration information based, at least in part, on the image processing service, the environmental information, and the different operational information, similarly as described regarding block 714 of FIG. 7.

At block 816, the apparatus causes user notification of the different image processing software configuration information. In at least one embodiment, the user notification comprises at least one alternative image processing software configuration information. At block 818, the apparatus determines whether an indication of user acceptance of the different image processing software configuration information was received. In at least one embodiment, an indication of user acceptance relates to an indication that a user has provided an input that is consistent with a user deciding to allow configuration to occur based on the different image processing software configuration information. If, at block 818, the apparatus determines that there was no received user acceptance, flow terminates. If, at block 818, the apparatus determines that the apparatus received an indication of user acceptance, flow proceeds to block 820. At block 820, the apparatus causes configuration of the at least one image processing software module based, at least in part, on the different image processing software configuration information, similarly as described regarding block 516 of FIG. 5.

Figure 9:
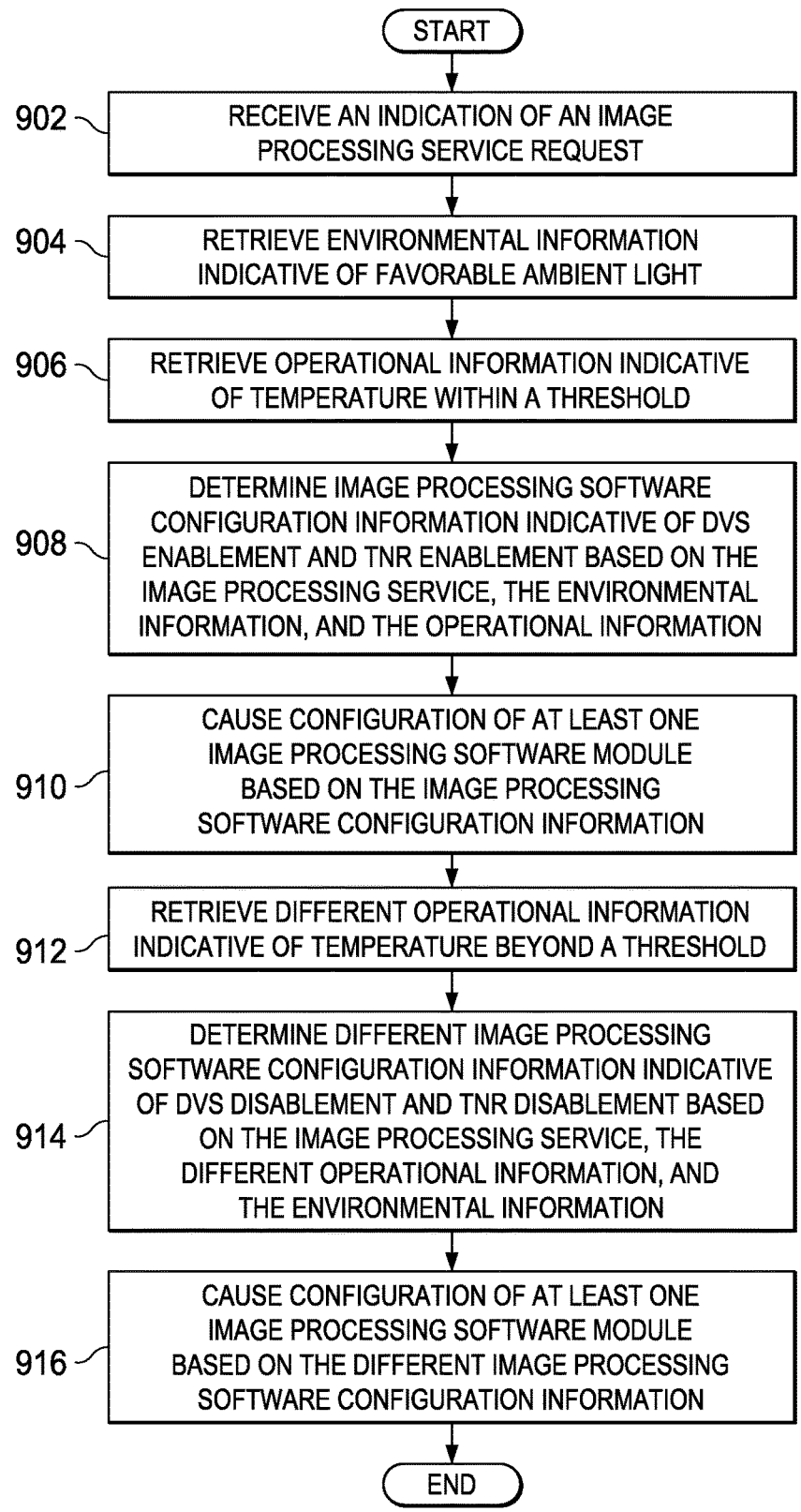
FIG. 9 is a flow diagram illustrating activities associated with image processing software module configuration according to at least one embodiment.

FIG. 9 is a flow diagram illustrating activities associated with image processing software module configuration according to at least one embodiment. In at least one embodiment, there is a set of operations that corresponds to the activities of FIG. 9. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 9.

At block 902, the apparatus receives an indication of an image processing service request, similarly as described regarding block 402 of FIG. 4. At block 904, the apparatus retrieves environmental information indicative of an environmental condition of favorable ambient light. The retrieval, the environmental information and the indication of favorable ambient light may be similar as described regarding FIGS. 1, 2, 3A, and 3B. At block 906, the apparatus retrieves operational information indicative of an operating condition of a temperature being within a threshold. The retrieval, the operational information and the indication of temperature being within a threshold may be similar as described regarding FIGS. 1, 2, 3A, and 3B.

At block 908, the apparatus determines image processing software configuration information indicative of DVS enablement and TNR enablement based, at least in part, on the image processing service, the environmental information, and the operational information. The determination and the image processing software configuration information may be similar as described regarding FIGS. 1, 2, 3A, and 3B.

At block 910, the apparatus causes configuration of at least one image processing software module based, at least in part, on the image processing software configuration information, similarly as described regarding block 410 of FIG. 4.

At block 912, the apparatus retrieves different operational information indicative of a temperature beyond a threshold. The retrieval, the operational information and the indication of temperature being beyond a threshold may be similar as described regarding FIGS. 1, 2, 3A, and 3B.

At block 914, the apparatus determines different image processing software configuration information indicative of DVS disablement and TNR disablement based, at least in part, on the image processing service, the environmental information, and the different operational information. The determination and the different image processing software configuration information may be similar as described regarding FIGS. 1, 2, 3A, and 3B.

At block 916, the apparatus causes configuration of the at least one image processing software module based, at least in part, on the different image processing software configuration information, similarly as described regarding block 516 of FIG. 5.

Figure 10:
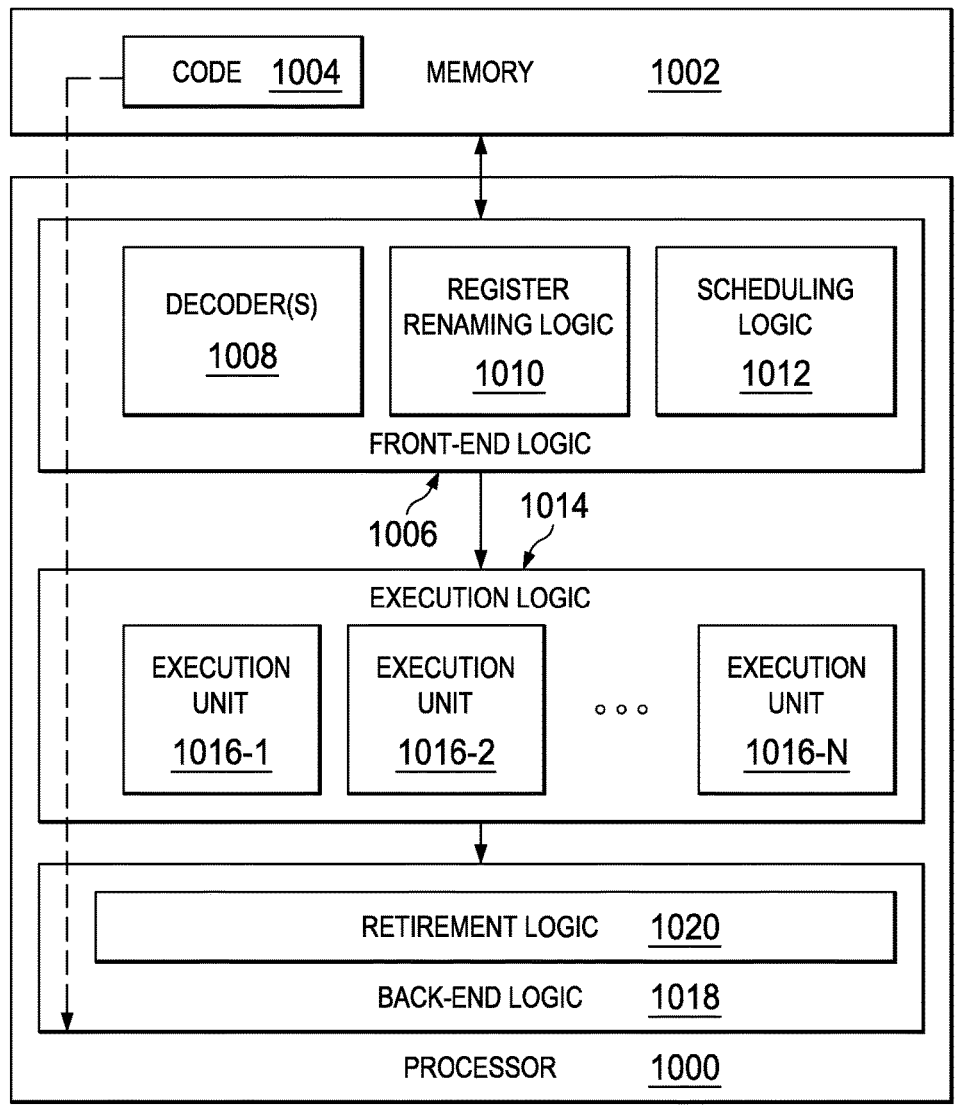
FIG. 10 is a block diagram showing a memory coupled to processor in accordance with an embodiment.
Figure 11:
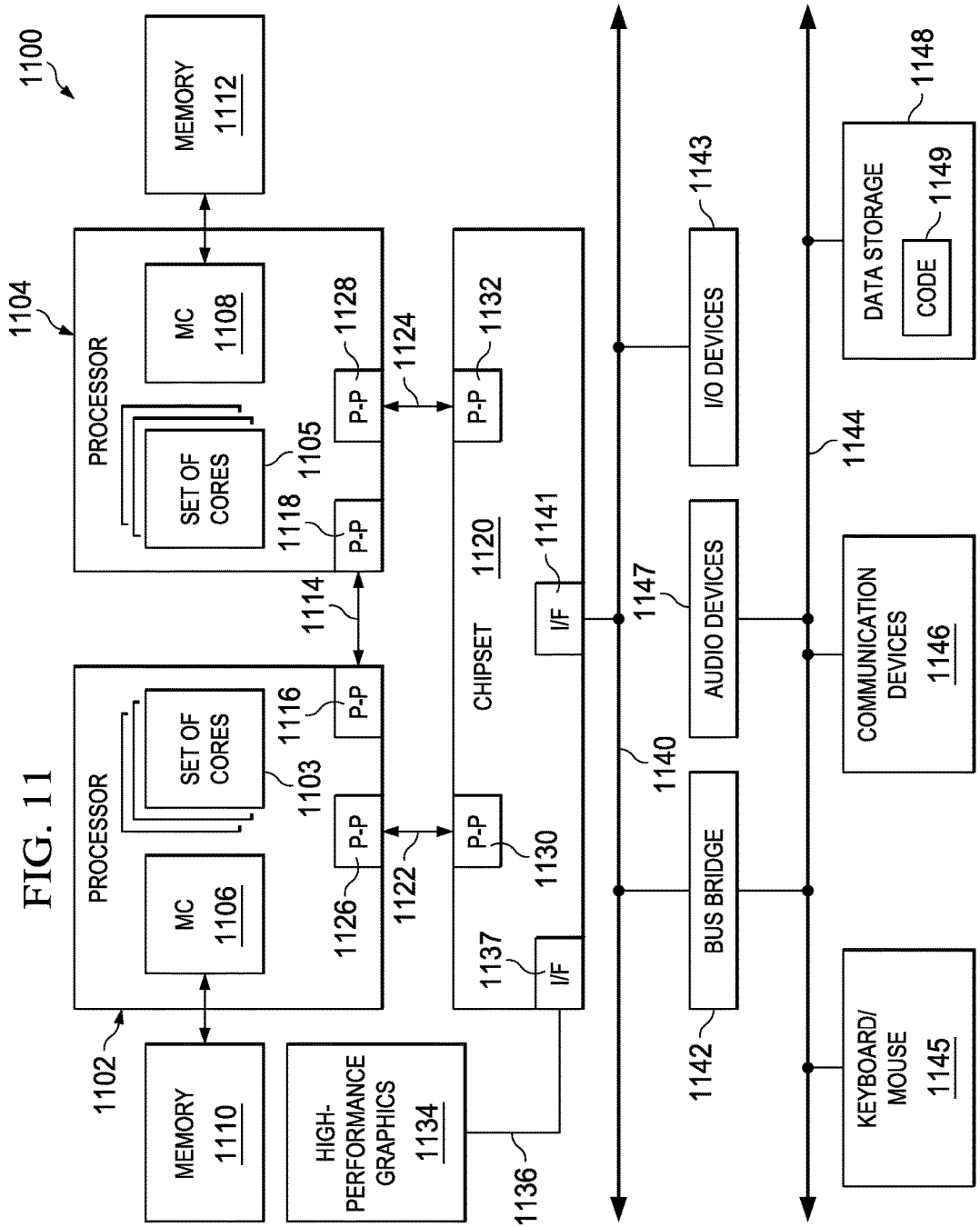
FIG. 11 is a block diagram showing a computing system that is arranged in a point-to-point (PtP) configuration according to an embodiment.

FIG. 10 illustrates a memory 1002 coupled to processor 1000 in accordance with at least one embodiment. Memory 1002 may be any of a wide variety of memories (including various layers of memory hierarchy). The memory 1002 may include code 1004, which may be one or more instructions, to be executed by processor 1000. Processor 1000 follows a program sequence of instructions indicated by code 1004. In at least one embodiment, an instruction enters a front-end logic 1006 and is processed by one or more decoders 1008. The decoder may generate a micro operation such as a fixed width micro operation in a predefined format, or may generate other instructions, microinstructions, control signals, and/or the like, that represent the instruction. Front-end logic 1006 also includes register renaming logic 1010 and scheduling logic 1012, which may allocate resources and queue the micro operation.

Processor 1000 is shown including execution logic 1014 having a set of execution units 1016-1 through 1016-N. At least one embodiment includes a number of execution units dedicated to specific functions or sets of functions. At least one embodiment includes only one execution unit or one execution unit that can perform a particular function. Execution logic 1014 executes the micro operation.

After completion of execution of the micro operations, back-end logic 1018 retires the instructions of code 1004. In one embodiment, processor 1000 allows out of order execution but enforces in order retirement of instructions. Retirement logic 1020 may take a variety of forms (e.g., re-order buffers or the like). In this manner, processor 1000 is transformed during execution of code 1004, at least in terms of the output generated by the decoder, hardware registers, and tables utilized by register renaming logic 1010, and any registers (not shown) modified by execution logic 1014.

Although not illustrated in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces.

As illustrated in FIG. 11, system 1100 may include several processors, of which only two, processors 1102 and 1104, are shown for clarity. Processors 1102 and 1104 may each include a set of cores 1103 and 1105, which may execute multiple processes of a program. Processors 1102 and 1104 may also each include integrated memory controller logic (MC) 1106 and 1108 to communicate with memories 1110 and 1112, respectively. The memories 1110 and/or 1112 may store various data such as those discussed with reference to memory 1112. In at least one embodiment, memory controller logic 1106 and 1108 is discrete logic separate from processors 1102 and 1104.

Processors 1102 and 1104 may be any type of a processor. Processors 1102 and 1104 may exchange data via a point-to-point (PtP) interface 1114 using point-to-point interface circuits 1116 and 1118, respectively. Processors 1102 and 1104 may each exchange data with a chipset 1120 via individual point-to-point interfaces 1122 and 1124 using point-to-point interface circuits 1126, 1128, 1130, and 1132. Chipset 1120 may exchange data with a high-performance graphics circuit 1134 via a high-performance graphics interface 1136, using an interface circuit 1137, which could be a PtP interface circuit. In at least one embodiment, any or all of the PtP links illustrated in FIG. 11 could be implemented as a multi-drop bus rather than a PtP link.

At least one embodiment, as disclosed herein, is provided within the processors 1102 and 1104. At least one embodiment, however, exists in other circuits, logic units, or devices within the system 1100 of FIG. 11. Furthermore, at least one embodiment is distributed throughout several circuits, logic units, or devices illustrated in FIG. 11.

Chipset 1120 may be in communication with a bus 1140 via an interface circuit 1141. Bus 1140 may have one or more devices that communicate over it, such as a bus bridge 1142 and I/O devices 1143. Via a bus 1144, bus bridge 1143 may be in communication with other devices such as a keyboard/mouse 1145 (or other input device such as a touch screen, for example), communication devices 1146 (such as modems, network interface devices, or other types of communication devices that may communicate through a computer network), audio I/O device 1147, a data storage device 1148, and/or the like. Data storage device 1148 may store code 1149 that may be executed by processors 1102 and/or 1104. In at least one embodiment, at least a portion of the bus architectures is implemented with one or more PtP links.

The computer systems depicted in FIGS. 10 and 11 are schematic illustrations of embodiments of computing systems that may be utilized in accordance with various embodiments. It will be appreciated that various components of the systems depicted in FIGS. 10 and 11 may be combined in a system-on-a-chip (SoC) architecture or in any other suitable configuration. For example, at least one embodiment disclosed herein can be incorporated into systems such as, for example, mobile devices such as smart cellular telephones, tablet computers, ultrabook computers personal digital assistants, portable gaming devices, etc. It will be appreciated that these mobile devices may be provided with SoC architectures in at least some embodiments.

Note that in at least one embodiment, at least one operation, activity, function, etc. outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In at least one embodiment, the logic may be computer program instructions, such as code 1004 of FIG. 10. In at least one embodiment, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In at least one embodiment, the processor transforms an element or an article (e.g., data) from one state or thing to another state or thing by way of the instructions. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

At least one embodiment includes software in order to achieve the activities outlined herein. A policy engine, for example policy engine 102 of FIG. 1, can include memory elements for storing information to be used in achieving the activities discussed herein. Additionally, the policy engine may include a processor that can execute software to perform the activities, as disclosed herein. These devices may further keep information in any suitable memory element (random access memory (RAM), ROM, EPROM, EEPROM, ASIC, etc.), software, hardware, or in any other suitable component, device, element, or object where appropriate and based on particular needs. Additionally, or alternatively, the policy engine can be software, hardware, firmware or a combination thereof. Any of the memory items discussed herein (e.g., databases, tables, trees, caches, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the components, modules, and/or the like (and their teachings) are readily scalable and can accommodate a large number of components, as well as more complicated/sophisticated arrangements and configurations. Accordingly, the examples provided should not limit the scope or inhibit the broad teachings of the policy engine as potentially applied to a myriad of other architectures.

It is also important to note that the operations in the preceding flow diagrams illustrate only some of the possible scenarios and patterns that may be executed in association with causing an operation to be performed in relation to a policy engine. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A policy engine may provide substantial flexibility in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure.

OTHER NOTES AND EXAMPLES

Example A1 is an apparatus comprising at least one processor and at least one memory, the at least one memory comprising instructions that when executed by the processor, cause the apparatus to perform, at least, the following: receive, at a policy engine, an indication of an image processing service request, retrieve, by a policy engine, environmental information indicative of an environmental condition of the apparatus, retrieve, by a policy engine, operational information indicative of an operating condition of the apparatus, determine, at a policy engine, image processing software configuration information based, at least in part, on the image processing service, the environmental information, and the operational information, and cause, from a policy engine, configuration of at least one image processing software module based, at least in part, on the image processing software configuration information.

In example A2, regarding the subject matter of example 1, the environmental condition relates to an environmental condition associated with a user's ability to perceive information on a display.

In example A3, regarding the subject matter of examples 1-2, the environmental condition relates to an environmental condition associated with capturing visual information.

In example A4, regarding the subject matter of examples 1-3, the environmental information is retrieved independently of an original equipment manufacturer software.

In example A5, regarding the subject matter of examples 1-4, the operational information relates to at least one of power consumption of at least part of, the apparatus or temperature of, at least part of, the apparatus.

In example A6, regarding the subject matter of examples 1-5, the operational information is retrieved independently of an original equipment manufacturer software.

In example A7, regarding the subject matter of example 6, the operational information is retrieved from a power management unit.

In example A8, regarding the subject matter of examples 1-7, the image processing software configuration information is independent of hardware performance configuration information.

In example A9, regarding the subject matter of examples 1-8, determination of the image processing software configuration information is based, at least in part, on a correlation between an effect of the at least one image processing software module and the environmental condition.

In example A10, regarding the subject matter of example 9, the environmental condition relates to motion and the effect of the at least one image processing software module relates to video stabilization.

In example A11, regarding the subject matter of examples 9-10, the environmental condition relates to ambient light the effect of the at least one image processing software module relates to video stabilization.

In example A12, regarding the subject matter of examples 9-11, the environmental condition relates to ambient light the effect of the at least one image processing software module relates to noise reduction.

In example A13, regarding the subject matter of examples 9-12, the environmental condition relates to ambient light the effect of the at least one image processing software module relates to light compensation.

In example A14, regarding the subject matter of examples 1-13, determination of the image processing software configuration information is based, at least in part, on priority information associated with the at least one image processing software module and at least one other image processing software module.

In example A15, regarding the subject matter of examples 1-14, determination of the image processing software configuration information is based, at least in part, on correlation between the operational information and operation profile information associated with the at least one image processing software module and the environmental condition.

In example A16, regarding the subject matter of examples 1-14, further comprising further comprising instructions that, when executed, cause an apparatus to retrieve different environmental information indicative of a change in the environmental condition.

In example A17, regarding the subject matter of example 16, further comprising instructions that, when executed, cause an apparatus to determine different image processing software configuration information based, at least in part, on the image processing service, the different environmental information, and the operational information.

In example A18, regarding the subject matter of example 17, further comprising instructions that, when executed, cause an apparatus to cause configuration of the at least one image processing software module based, at least in part, on the different image processing software configuration information.

In example A19, regarding the subject matter of example 18, causation of configuration of the at least one image processing software module are performed absent user notification of the different image processing software configuration information.

In example A20, regarding the subject matter of examples 18-19, further comprising instructions that, when executed, cause an apparatus to: cause user notification of the different image processing software configuration information, and receive an indication of user acceptance of the different image processing software configuration information.

In example A21, regarding the subject matter of examples 18-20, the image processing software configuration information relates to an algorithm, and the different image processing software configuration information relates to a downgraded algorithm.

In example A22, regarding the subject matter of examples 1-21, further comprising instructions that, when executed, cause an apparatus to: retrieve different operational information indicative of a change in the operational condition, determine different image processing software configuration information based, at least in part, on the image processing service, the environmental information, and the different operational information, and cause configuration of the at least one image processing software module based, at least in part, on the different image processing software configuration information.

In example A23, regarding the subject matter of example 22, causation of configuration of the at least one image processing software module are performed absent user notification of the different image processing software configuration information.

In example A24, regarding the subject matter of examples 22-23, the change in operational condition relates to an increase of at least one of temperature or power consumption, and the different image processing software configuration information relates to disablement of the at least one image processing software module.

Example C1 is at least one computer readable storage medium comprising instructions that, when executed, cause an apparatus to: receive, at a policy engine, an indication of an image processing service request, retrieve, by a policy engine, environmental information indicative of an environmental condition of the apparatus, retrieve, by a policy engine, operational information indicative of an operating condition of the apparatus, determine, at a policy engine, image processing software configuration information based, at least in part, on the image processing service, the environmental information, and the operational information, and cause, from a policy engine, configuration of at least one image processing software module based, at least in part, on the image processing software configuration information.

In example C2, regarding the subject matter of example 1, the environmental condition relates to an environmental condition associated with a user's ability to perceive information on a display.

In example C3, regarding the subject matter of examples 1-2, the environmental condition relates to an environmental condition associated with capturing visual information.

In example C4, regarding the subject matter of examples 1-3, the environmental information is retrieved independently of an original equipment manufacturer software.

In example C5, regarding the subject matter of examples 1-4, the operational information relates to at least one of power consumption of at least part of, the apparatus or temperature of, at least part of, the apparatus.

In example C6, regarding the subject matter of examples 1-5, the operational information is retrieved independently of an original equipment manufacturer software.

In example C7, regarding the subject matter of example 6, the operational information is retrieved from a power management unit.

In example C8, regarding the subject matter of examples 1-7, the image processing software configuration information is independent of hardware performance configuration information.

In example C9, regarding the subject matter of examples 1-8, determination of the image processing software configuration information is based, at least in part, on a correlation between an effect of the at least one image processing software module and the environmental condition.

In example C10, regarding the subject matter of example 9, the environmental condition relates to motion and the effect of the at least one image processing software module relates to video stabilization.

In example C11, regarding the subject matter of examples 9-10, the environmental condition relates to ambient light the effect of the at least one image processing software module relates to video stabilization.

In example C12, regarding the subject matter of examples 9-11, the environmental condition relates to ambient light the effect of the at least one image processing software module relates to noise reduction.

In example C13, regarding the subject matter of examples 9-12, the environmental condition relates to ambient light the effect of the at least one image processing software module relates to light compensation.

In example C14, regarding the subject matter of examples 1-13, determination of the image processing software configuration information is based, at least in part, on priority information associated with the at least one image processing software module and at least one other image processing software module.

In example C15, regarding the subject matter of examples 1-14, determination of the image processing software configuration information is based, at least in part, on correlation between the operational information and operation profile information associated with the at least one image processing software module and the environmental condition.

In example C16, regarding the subject matter of examples 1-14, further comprising further comprising instructions that, when executed, cause an apparatus to retrieve different environmental information indicative of a change in the environmental condition.

In example C17, regarding the subject matter of example 16, further comprising instructions that, when executed, cause an apparatus to determine different image processing software configuration information based, at least in part, on the image processing service, the different environmental information, and the operational information.

In example M18, regarding the subject matter of example 17, further comprising instructions that, when executed, cause an apparatus to cause configuration of the at least one image processing software module based, at least in part, on the different image processing software configuration information.

In example C19, regarding the subject matter of example 18, causation of configuration of the at least one image processing software module are performed absent user notification of the different image processing software configuration information.

In example C20, regarding the subject matter of examples 18-19, further comprising instructions that, when executed, cause an apparatus to: cause user notification of the different image processing software configuration information, and receive an indication of user acceptance of the different image processing software configuration information.

In example C21, regarding the subject matter of examples 18-20, the image processing software configuration information relates to an algorithm, and the different image processing software configuration information relates to a downgraded algorithm.

In example C22, regarding the subject matter of examples 1-21, further comprising instructions that, when executed, cause an apparatus to: retrieve different operational information indicative of a change in the operational condition, determine different image processing software configuration information based, at least in part, on the image processing service, the environmental information, and the different operational information, and cause configuration of the at least one image processing software module based, at least in part, on the different image processing software configuration information.

In example C23, regarding the subject matter of example 22, causation of configuration of the at least one image processing software module are performed absent user notification of the different image processing software configuration information.

In example C24, regarding the subject matter of examples 22-23, the change in operational condition relates to an increase of at least one of temperature or power consumption, and the different image processing software configuration information relates to disablement of the at least one image processing software module.

Example M1 is a method comprising performing at least the following: receive, at a policy engine, an indication of an image processing service request, retrieve, by a policy engine, environmental information indicative of an environmental condition of the apparatus, retrieve, by a policy engine, operational information indicative of an operating condition of the apparatus, determine, at a policy engine, image processing software configuration information based, at least in part, on the image processing service, the environmental information, and the operational information, and cause, from a policy engine, configuration of at least one image processing software module based, at least in part, on the image processing software configuration information.

In example M2, regarding the subject matter of example 1, the environmental condition relates to an environmental condition associated with a user's ability to perceive information on a display.

In example M3, regarding the subject matter of examples 1-2, the environmental condition relates to an environmental condition associated with capturing visual information.

In example M4, regarding the subject matter of examples 1-3, the environmental information is retrieved independently of an original equipment manufacturer software.

In example M5, regarding the subject matter of examples 1-4, the operational information relates to at least one of power consumption of, at least part of, the apparatus or temperature of, at least part of, the apparatus.

In example M6, regarding the subject matter of examples 1-5, the operational information is retrieved independently of an original equipment manufacturer software.

In example M7, regarding the subject matter of example 6, the operational information is retrieved from a power management unit.

In example M8, regarding the subject matter of examples 1-7, the image processing software configuration information is independent of hardware performance configuration information.

In example M9, regarding the subject matter of examples 1-8, determination of the image processing software configuration information is based, at least in part, on a correlation between an effect of the at least one image processing software module and the environmental condition.

In example M10, regarding the subject matter of example 9, the environmental condition relates to motion and the effect of the at least one image processing software module relates to video stabilization.

In example M11, regarding the subject matter of examples 9-10, the environmental condition relates to ambient light the effect of the at least one image processing software module relates to video stabilization.

In example M12, regarding the subject matter of examples 9-11, the environmental condition relates to ambient light the effect of the at least one image processing software module relates to noise reduction.

In example M13, regarding the subject matter of examples 9-12, the environmental condition relates to ambient light the effect of the at least one image processing software module relates to light compensation.

In example M14, regarding the subject matter of examples 1-13, determination of the image processing software configuration information is based, at least in part, on priority information associated with the at least one image processing software module and at least one other image processing software module.

In example M15, regarding the subject matter of examples 1-14, determination of the image processing software configuration information is based, at least in part, on correlation between the operational information and operation profile information associated with the at least one image processing software module and the environmental condition.

In example M16, regarding the subject matter of examples 1-14, further comprising performing at least the following: retrieve different environmental information indicative of a change in the environmental condition.

In example M17, regarding the subject matter of example 16, further comprising performing at least the following: determine different image processing software configuration information based, at least in part, on the image processing service, the different environmental information, and the operational information.

In example M18, regarding the subject matter of example 17, further comprising performing at least the following: cause configuration of the at least one image processing software module based, at least in part, on the different image processing software configuration information.

In example M19, regarding the subject matter of example 18, causation of configuration of the at least one image processing software module are performed absent user notification of the different image processing software configuration information.

In example M20, regarding the subject matter of examples 18-19, further comprising performing at least the following: cause user notification of the different image processing software configuration information, and receive an indication of user acceptance of the different image processing software configuration information.

In example M21, regarding the subject matter of examples 18-20, the image processing software configuration information relates to an algorithm, and the different image processing software configuration information relates to a downgraded algorithm.

In example M22, regarding the subject matter of examples 1-21, further comprising performing at least the following: retrieve different operational information indicative of a change in the operational condition, determine different image processing software configuration information based, at least in part, on the image processing service, the environmental information, and the different operational information, and cause configuration of the at least one image processing software module based, at least in part, on the different image processing software configuration information.

In example M23, regarding the subject matter of example 22, causation of configuration of the at least one image processing software module are performed absent user notification of the different image processing software configuration information.

In example M24, regarding the subject matter of examples 22-23, the change in operational condition relates to an increase of at least one of temperature or power consumption, and the different image processing software configuration information relates to disablement of the at least one image processing software module.

What is claimed is:

1. An apparatus comprising
   at least one hardware processor; and
   at least one memory, the at least one memory comprising instructions that when executed by the hardware processor, cause the apparatus to perform, at least, the following:
      receive, at a policy engine, an indication of an image processing service request for an image processing service;
      retrieve, by the policy engine, first environmental information indicative of at least one environmental condition of the apparatus;
      retrieve, by the policy engine, operational information indicative of at least one operating condition of the apparatus;
      determine, at the policy engine, first image processing software configuration information indicating a level of functionality for at least one image processing software module associated with the image processing service, wherein the level of functionality is based, at least in part, on the image processing service, the first environmental information, and the operational information;
      cause a first adaptive configuration of the at least one image processing software module based, at least in part, on the level of functionality indicated in the first image processing software configuration information;
      retrieve second environmental information indicative of a change in the environmental condition;
      determine second image processing software configuration information based, at least in part, on the image processing service and the second environmental information; and
      cause a second adaptive configuration of the at least one image processing software module based, at least in part, on the second image processing software configuration information.

2. The apparatus of claim 1, wherein the first and second environmental conditions relate to a user's ability to perceive information on a display.

3. The apparatus of claim 1, wherein the first and second environmental conditions relate to capturing visual information.

4. The apparatus of claim 1, wherein the first and second environmental information are retrieved independently of an original equipment manufacturer software.

5. The apparatus of claim 1, wherein the operational information relates to at least one of power consumption of, at least part of, the apparatus or temperature of, at least part of, the apparatus.

6. The apparatus of claim 1, wherein the operational information is retrieved independently of an original equipment manufacturer software.

7. The apparatus of claim 6, wherein the operational information is retrieved from a power management unit.

8. The apparatus of claim 1, wherein the first and second image processing software configuration information are independent of hardware performance configuration information.

9. The apparatus of claim 1, wherein determination of the first image processing software configuration information is based, at least in part, on a correlation between an effect of the at least one image processing software module and the first environmental condition.

10. The apparatus of claim 9, wherein the first environmental condition relates to motion of the apparatus and the effect of the at least one image processing software module relates to video stabilization.

11. The apparatus of claim 9, wherein the first and second environmental conditions relate to ambient light and the effect of the at least one image processing software module relates to video stabilization.

12. The apparatus of claim 9, wherein the first and second environmental conditions relate to ambient light and the effect of the at least one image processing software module relates to noise reduction.

13. The apparatus of claim 9, wherein the first and second environmental conditions relate to ambient light and the effect of the at least one image processing software module relates to light compensation.

14. At least one non-transitory computer readable storage medium comprising instructions that, when executed, cause at least one processor to:
  receive an indication of an image processing service request for an image processing service;
  retrieve first environmental information indicative of at least one environmental condition of an apparatus;
  retrieve operational information indicative of at least one operating condition of the apparatus;
  determine first image processing software configuration information indicating a level of functionality for at least one image processing software module associated with the image processing service, wherein the level of functionality is based, at least in part, on the image processing service, the first environmental information, and the operational information;
  cause a first adaptive configuration of the at least one image processing software module based, at least in part, on the level of functionality indicated in the first image processing software configuration information;
  retrieve second environmental information indicative of a change in the environmental condition;
  determine second image processing software configuration information based, at least in part, on the image processing service and the second environmental information; and
  cause a second adaptive configuration of the at least one image processing software module based, at least in part, on the second image processing software configuration information.

15. The at least one non-transitory computer readable storage medium of claim 14, wherein determination of the first image processing software configuration information is based, at least in part, on priority information associated with the at least one image processing software module and at least one other image processing software module.

16. The at least one non-transitory computer readable storage medium of claim 14, wherein determination of the first image processing software configuration information is based, at least in part, on correlation between the operational information and operation profile information associated with the at least one image processing software module and the first environmental condition.

17. The at least one non-transitory computer readable storage medium of claim 14, wherein causations of configuration of the at least one image processing software module are performed absent user notification of the first and second image processing software configuration information.

18. The medium of claim 14, further comprising instructions that, when executed, cause an apparatus to: cause user notification of the different image processing software configuration information; and receive an indication of user acceptance of the different image processing software configuration information.

19. The at least one non-transitory computer readable storage medium of claim 14, wherein the first image processing software configuration information relates to an algorithm, and the second image processing software configuration information relates to a downgraded algorithm.

20. The at least one non-transitory computer readable storage medium of claim 14, further comprising instructions that, when executed, cause an apparatus to:
  retrieve different operational information indicative of a change in the operational condition,
  wherein the second image processing software configuration information is determined based, in part, on the different operational information.

21. The at least one non-transitory computer readable storage medium of claim 14, wherein the at least one image processing software module is associated with one layer of a plurality of layers of an image capturing stack.

22. An apparatus comprising:
  at least one environmental sensor to provide first environmental information indicative of at least one environmental condition;
  at least one operational sensor to provide operation information indicative of at least one operating condition of the apparatus
  at least one image processing module to perform image processing;
  at least one hardware processor; and
  a policy engine that, when executed by the at least one hardware processor, is to:
    receive an indication of an image processing service request for an image processing service;
    retrieve, from the environmental sensor, the first environmental information indicative of the at least one environmental condition of the apparatus;

retrieve, from the operational sensor, the operational information indicative of the at least one operating condition of the apparatus;

determine first image processing software configuration information indicating a level of functionality for at least one image processing software module associated with the image processing service, wherein the level of functionality is based, at least in part, on the image processing service, the first environmental information, and the operational information;

cause a first adaptive configuration of the at least one image processing software module based, at least in part, on the level of functionality indicated in the first image processing software configuration information;

retrieve second environmental information indicative of a change in the environmental condition;

determine second image processing software configuration information based, at least in part, on the image processing service and the second environmental information; and cause a second adaptive configuration of the at least one image processing software module based, at least in part, on the second image processing software configuration information.

23. The apparatus of claim 22, further comprising a power management unit, wherein the operational information is received by way of the power management unit.

24. A method comprising:

receiving an indication of an image processing service request for an image processing service;

retrieving first environmental information indicative of at least one environmental condition of an apparatus;

retrieving operational information indicative of at least one operating condition of the apparatus;

determining, by a hardware processor, first image processing software configuration information indicating a level of functionality for at least one image processing software module associated with the image processing service, wherein the level of functionality is based, at least in part, on the image processing service, the first environmental information, and the operational information;

causing a first adaptive configuration of the at least one image processing software module based, at least in part, on the level of functionality indicated in the first image processing software configuration information;

retrieve second environmental information indicative of a change in the environmental condition;

determine second image processing software configuration information based, at least in part, on the image processing service and the second environmental information; and cause a second adaptive configuration of the at least one image processing software module based, at least in part, on the second image processing software configuration information.

25. The method of claim 24, wherein determination of the first image processing software configuration information is based, at least in part, on priority information associated with the at least one image processing software module and at least one other image processing software module.

* * * * *